UNITED STATES PATENT OFFICE 2,129,674

PHENYL SULPHIDES

Walter G. Christiansen, Glen Ridge, N. J., and Eugene Moness, Brooklyn, N. Y., assignors to E. R. Squibb & Sons, New York, N. Y., a corporation of New York No Drawing. Application August 31, 1933, Serial No. 687,732

4 Claims. (Cl. 260—150)

This invention relates to, and has for its object the provision of, certain phenyl sulphides and methods of preparing them.

The compounds embraced by this invention have the general formula (XS)(C₆H₃)(OY)(Z) particularly

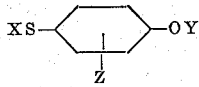

wherein X represents an alkyl or an aryl, Y represents hydrogen, an alkyl, or a substituted alkyl, and Z represents an alkyl or carboxy when X is an aryl and Y is hydrogen or methyl, but otherwise represents either an alkyl, carboxy, or hydrogen; and are characterized by valuable bactericidal properties. They may be prepared by processes of the Zeigler and Hinsberg types (see, for example, the paper by Hilbert and Johnson on pages 1526–1536 of volume 51 of the Journal of the American Chemical Society), which, to secure substantially complete purity and therefore maximum activity, must be supplemented by the steps of gasoline extraction and vacuum distillation.

Subgenus 1

Compounds having the general formula

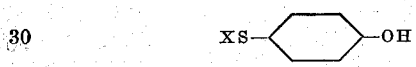

wherein X represents alkyl:

For example, amyl parahydroxy phenyl sulphide,

may be prepared as follows: To a solution of 5.9 g. of paramethoxy thiophenol in 50 cc. of alcohol containing 0.970 g. of sodium, an alcoholic solution of 6.21 g. of normal amyl bromide is added. The solution is refluxed on the steam-bath for three hours and filtered from the precipitated sodium bromide and on evaporation of the alcohol, 64 g. of paramethoxy phenyl amyl sulphide, a light-yellow oil, is obtained. 50 g. of this oil is added to a mixture of 22.6 g. of acetic anhydride and 9.9 g. of 48% hydrobromic acid, the solution is heated on the steam-bath for 8 hours and the excess hydrobromic acid and acetic anhydride are distilled off in vacuo. The remaining oil is dissolved in alkali and the solution extracted with ether to remove undemethylated compound. The solution is now acidified, the precipitated black oil is dissolved in ether, and the ethereal solution shaken with activated carbon, the carbon filtered out, the ether evaporated, and the remaining red oil is distilled. The amyl parahydroxy phenyl sulphide so obtained is crystalline but oily and boils at 123–131° C/2–3 mm.

This compound is destructive to typhoid bacilli in 5 and 10 minutes, respectively, in concentrations of 1:1,000 and 1:2,500 and to staphlyococci in 5 minutes in a concentration of 1:10,000.

By substituting for the normal amyl bromide of the foregoing example the bromide of some other alkyl—say ethyl, normal propyl, isopropyl, isobutyl, hexyl, heptyl—that alkyl may of course be introduced at X in the general formula.

Subgenus 2

Compounds having the general formula

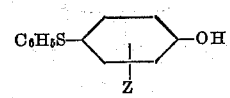

wherein Z represents an alkyl or carboxy, especially 2-methyl-4-hydroxy diphenyl sulphide, 3-methyl 4-hydroxy diphenyl sulphide, 3-ethyl 4-hydroxy diphenyl sulphide, 3-carboxy-4-hydroxy diphenylsulphide. Other such compounds include 3-butyl 4-hydroxy diphenyl, 3-hexyl 4-hydroxy diphenyl:

For example, 3-methyl 4-hydroxy diphenyl sulphide may be prepared by heating benzene sulphinic acid with orthocresol, in the respective molecular proportions of 2 and 1, the reaction equation being:

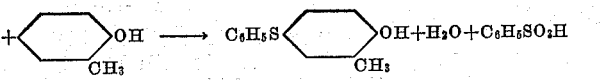

More specifically, a mixture of 41 g. of benzene sulphinic acid and 16 g. of orthocresol is heated for six hours on the steam-bath under a reflux condenser, the reaction mixture is added to about 100 cc. of water, and solid sodium carbonate is added until the liquid becomes alkaline to litmus, to convert the benzene sulphonic acid into its sodium salt. The solution is distilled with steam to remove unreacted cresol and is then acidified, the precipitated oil is extracted with ether, and the ether is removed by evaporation. There remains the crude sulphide sought, as a dark red, almost black, resinous mass.

An alternative series of reactions for obtaining the crude sulphide is indicated below:

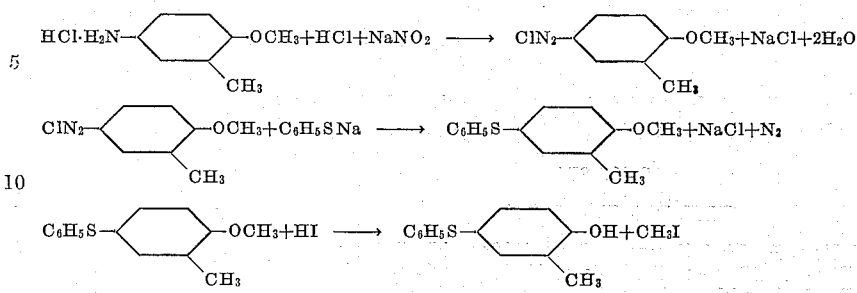

To increase the bactericidal potency of such crude sulphides, they are subjected to purification by extracting with gasoline, evaporating the extract, and then distilling under vacuum.

More specifically, the 3-methyl 4-hydroxy diphenyl sulphide prepared by the first process described above is extracted by boiling with 100 cc. of gasoline; the extract is evaporated and the residue is boiled with 100 cc. of gasoline; the extract is evaporated and the residue is distilled under vacuum. There is obtained pure 3-methyl 4-hydroxy diphenyl sulphide, a crystalline compound having a melting point of 72° C. and a boiling point of 185–190° C./4 mm. Similarly, 2-methyl 4-hydroxy diphenyl sulphide may be obtained as a (probably crystallizable) liquid having a boiling point of 180–190° C./2 mm.

It is found that staphylococci are killed in 5 and 10 minutes, respectively, by 2-methyl 4-hydroxy diphenyl sulphide in concentrations of 1:5,000 and 1:10,000 and in 5 minutes by 3-methyl 4-hydroxy diphenyl sulphide in a concentration of 1:25,000; and that 3-ethyl 4-hydroxy diphenyl sulphide kills typhoid bacilli in 5 minutes in a concentration of 1:5,000, and staphylococci in 5 and 10 minutes, respectively, in concentrations of 1:20,000 and 1:30,000.

*Subgenus 3*

Compounds having the general formula $$C_6H_5S-\underset{Z}{\underset{|}{\bigcirc}}-OY$$

wherein Y represents an alkyl or a substituted alkyl and Z represents an alkyl when Y is methyl, but otherwise represents either an alkyl or hydrogen, especially the betadiethylaminoethyl ethers of 4-hydroxy diphenyl sulphide, of 3-methyl 4-hydroxy diphenyl sulphide, of 3-ethyl 4-hydroxy diphenyl sulphide, of 4-ethoxy diphenyl sulphide, methyl 4-methoxy diphenyl sulphide, and ethyl 4-methoxy diphenyl sulphide. Other such compounds include 4-dibutylaminopropoxy diphenyl sulphide, 4-gammadiethylamino-betadimethyl-propoxy diphenyl sulphide, 3-butyl 4-ethoxy diphenyl sulphide, ethyl 4-diethylaminoethoxy diphenyl sulphide:

For example, $$C_6H_5S-\bigcirc-OC_2H_4N(C_2H_5)_2 \cdot HCl$$

may be prepared as follows: To a solution of 1.38 g. of sodium in 58 cc. of absolute alcohol are added 6.06 g. of $$C_6H_5S-\bigcirc-OH$$

and 7.83 g. of diethylamino ethyl bromide hydrobromide dissolved in 58 cc. of alcohol; the solution is refluxed on the steam-bath for 15 hours and the reaction mixture filtered. The residue is freed from alcohol by evaporation, is dissolved in water, and is acidified with hydrochloric acid. Any unreacted hydroxy diphenyl sulphide is then removed by ether extraction. The solution is alkalinized and steam-distilled to remove any unreacted diethylamino ethyl bromide, after which it is extracted with ether and the ether extract thoroughly dried by means of anhydrous sodium sulphate. Dry hydrochloric acid is passed through the ethereal solution to precipitate the compound sought. This compound dissolves readily in water yielding a practically neutral solution. It is slightly anesthetic and kills typhoid bacilli in 5 and 10 minutes, respectively, in concentrations of 1:3,000 and 1:4,000, and staphylococci in 5 and 10 minutes, respectively, in concentrations of 1:200 and 1:400.

Similarly prepared 3-methyl 4-betadiethylaminoethoxy diphenyl sulphide hydrochloride kills typhoid bacilli in 5 and 10 minutes, respectively, in concentrations of 1:1,000 and 1:5,000, and staphylococci in 5 and 10 minutes, respectively, in concentrations of 1:200 and 1:400.

As a further example, $$C_6H_5S-\bigcirc-OC_2H_5$$

may be prepared by dissolving 2.9 g. of sodium in 40 cc. of absolute alcohol; adding 14.3 g. of thiophenol; distilling off the alcohol; adding 28 g. of parabromphenetol and 0.4 g. of copper powder; heating the mixture on the oil-bath at 280° C. for eight hours; extracting the semi-solid mass with alcohol; acidifying, adding zinc, and steam-distilling; extracting the zinc-salt solution with ether; drying the extract over anhydrous sodium sulphate; and distilling off the ether.

It is to be understood that the foregoing examples are merely illustrative and by no means limitative of the invention, which may be variously otherwise embodied—as with respect to particular compounds and processes—within the scope of the appended claims, which are intended to embrace not only the compounds proper but also, in the case of the amino ethers, their hydrochlorides.

We claim:
1. In the preparation of compounds having the general formula

$$C_6H_5S-\underset{Z}{\underset{|}{\bigcirc}}-OH$$

wherein Z represents alkyl, by reaction of benzene sulphinic acid and ortho-alkyl phenol, the steps of gasoline extraction and vacuum distillation of the crude reaction product.

2. In the preparation of compounds having the general formula $$C_6H_5S-\underset{|}{\bigcirc}-OH$$

wherein Z represents a member of the group consisting of hydrogen and alkyl, by reacting $C_6H_5SO_2H$ with

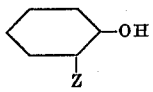

the steps of gasoline extraction and vacuum distillation of the crude product.

3. In the preparation of 3-methyl 4-hydroxy diphenyl sulphide by reacting benzene sulphinic acid with orthocresol, the steps of gasoline extraction and vacuum distillation of the crude product.

4. In the preparation of phenyl sulphides by reaction of aromatic sulphinic acids and phenols, the steps of gasoline extraction and vacuum distillation of the crude reaction product.

WALTER G. CHRISTIANSEN.
EUGENE MONESS.